United States Patent [19]

Nagahara

[11] 4,421,405

[45] Dec. 20, 1983

[54] MULTIPLE MODE COPYING APPARATUS

[75] Inventor: Yasumori Nagahara, Yokosuka, Japan

[73] Assignee: Ricoh Company, Ltd., Japan

[21] Appl. No.: 382,100

[22] Filed: May 26, 1982

[30] Foreign Application Priority Data

May 27, 1981 [JP] Japan ................................ 56-79150

[51] Int. Cl.³ ................................................ G03B 27/36

[52] U.S. Cl. .......................................... 355/58; 355/8; 355/11; 355/60

[58] Field of Search ....................... 355/58, 55, 56, 57, 355/60, 65, 66, 8, 11

[56] References Cited

U.S. PATENT DOCUMENTS 4,077,715 3/1978 Greene ............................. 355/58 X 4,093,374 6/1978 Zucker et al. .................... 355/58 X 4,099,866 7/1978 Jones et al. .......................... 355/58

4,142,793 3/1979 Schilling ............................... 355/58

4,209,248 6/1980 Gibson et al. .................... 355/58 X

*Primary Examiner*—R. L. Moses

*Attorney, Agent, or Firm*—Guy W. Shoup

[57] ABSTRACT

A multiple mode copying apparatus including a drive for moving a lens in the direction of a principal light beam, a conversion cam for converting the distance covered by the movement of a lens into a rotational angle, and a mirror moving device for moving mirrors in accordance with the rotational angle. The conversion cam is formed with a first cam surface for deciding the distance to be covered by the movement of the mirrors and a second cam surface for following up the distance covered by the movement of the lens. The second cam surface is profiled such that it is in the form of an arc such that when a cam follower moves past a point of contact of the cam follower for effecting copying without magnification and reduction, the direction movement of the cam member is reversed by starting at the point of contact thereof. By selecting a suitable profile for the second cam surface, it is possible to have the first cam surface profiled to be in the form of a straight line.

2 Claims, 10 Drawing Figures

MULTIPLE MODE COPYING APPARATUS

BACKGROUND OF THE INVENTION

This invention relates to multiple mode copying apparatus provided with an optical system capable of varying the multiplication of images formed, and more particularly it is concerned with a multiple mode copying apparatus equipped with a mechanism capable of effecting both magnification and reduction.

In copying apparatus, a light irradiation position for a document to be copied and an exposing position in which a photosensitive member is exposed to an optical image of the document are both fixed, and an optical system for introducing light beams irradiating the document to the photosensitive member includes a lens and mirrors to obtain an overall compact size in a copying apparatus. In such optical system, an optical path is complex to allow the light beams to be reflected several times. The more complicated the optical path, the more complex becomes a magnification varying mechanism.

Heretofore, it has been usual practice for multiple mode copying apparatus to be able to effect copying in the same size as the document to be copied and on a reduced scale. If it is possible to effect copying in the same size as the original, on a reduced scale and an enlarged scale by means of a single device, the utility of the copying apparatus would be enhanced. However, when a single device is relied on for performing copying in the aforesaid triple mode, the following difficulties would be encountered. As subsequently to be described in detail, the lens and mirrors move in the same direction when copying is performed in reduction mode and in the opposite directions when copying is performed in magnification mode. Thus the mechanism would become complex in construction and high in cost if the device were based on the concept of the prior art. Besides, operation could not be performed smoothly.

SUMMARY OF THE INVENTION

This invention has been developed for the purpose of obviating the aforesaid disadvantages of the prior art. Accordingly the invention has as its object the provision of a multiple mode copying apparatus capable of performing copying both in reduction and in enlarging modes by using a single multiple mode copying mechanism of simple construction.

DESCRIPTION OF THE PREFERRED EMBODIMENT

Figure 1:
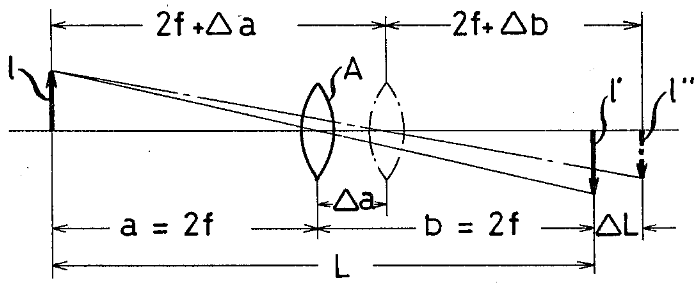
FIGS. 1–3 are views showing the relation between the subject, the lens and the image forming surface when magnification is varied for each copying mode, FIG. 1 being a view of the relation obtained in reduction mode in which the main light beam coincides with the optical axis, FIG. 2 being a view of the relation obtained in magnification mode, and FG. 3 being a view of the relation obtained when the main light beam obliquely intersects the optical axis.

Before describing the preferred embodiment of the invention in detail, the principle of the relation between the subject, the lens and the image forming surface of the image forming optical system obtained and the directions of movements of the lens and mirrors and the distances covered by such movements obtained when magnification is varied will be outlined. In FIG. 1, when an image l of a document to be copied is formed on an image forming surface, such as a photosensitive member, as an image l' by means of a lens A of a focal distance f, a=b=2f if copying is effected without varying the size of the image of the document. In this case, a is the distance between the subject l and the lens A, b is the distance between the lens A and the image l', with 1/a+1/b=1/f.

Let us discuss, by using the aforesaid positional relation established when the image formed on the image forming surface is the same size as the image of the document to be copied, changes that the positions of the lens and the image would undergo with respect to the position of the subject when magnification is varied in performing copying. If the lens A is moved a distance Δa to a position shown in dash-and-dot lines in FIG. 1, the following relations will hold when the distance between the lens and an image l'' is 2f+Δb:

$$\frac{1}{2f+\Delta a}+\frac{1}{2f+\Delta b}=\frac{1}{f}$$

$$\text{magnification } m=\frac{2f+\Delta b}{2f+\Delta a}$$

consequently, $$\Delta a=\left(\frac{1}{m}-1\right)f$$

$$\Delta b=(m-1)f.$$

The displacement ΔL from the image forming position l obtained when copying is effected without varying the size of the image of the document to the image l'' is expressed by the following equation:

$$\Delta L=\Delta a+\Delta b=\left(m+\frac{1}{m}-2\right)f.$$

Figure 2:
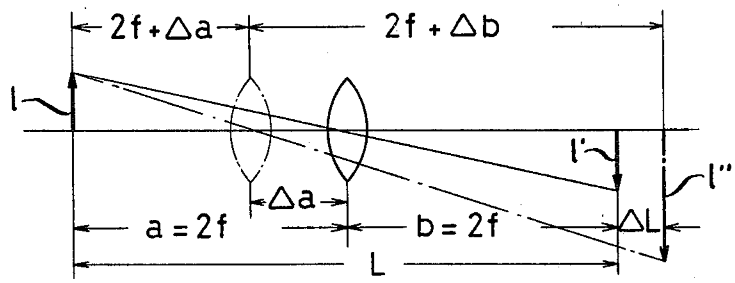

FIG. 1 shows the movement of the lens and the image forming surface that occurs when copying is effected in reduction mode. However, when copying is performed in magnification, it is necessary to move the lens A closer to the surface of the document as shown in FIG. 2, and the value of Δa becomes negative but the aforesaid relation still holds.

Figure 3:
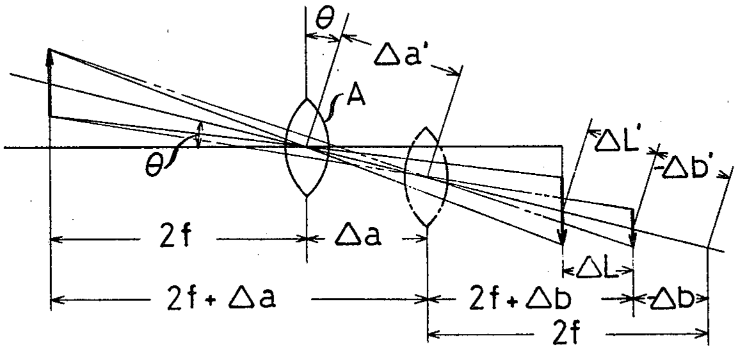

In a slit exposing device, oblique light beams in which the principal light beam does not coincide with the optical axis of the lens or it tilts an angle θ with respect to the optical axis are used in many cases. In this case, the following relations will hold if the distance covered by the movement of the lens with respect to the subject, the distance covered by the movement of the image with respect to the lens, and the distance covered by the movement of the image forming surface in the direction of movement of the principal light beam are denoted by a', b' and L' respectively in FIG. 3:

$$\Delta a' = \Delta a/\cos\theta = \left(\frac{1}{m} - 1\right) f/\cos\theta$$

$$\Delta b' = \Delta b/\cos\theta = (m-1)f/\cos\theta$$

$$\Delta L' = \Delta L/\cos\theta = \left(m + \frac{1}{m} - 2\right) f/\cos\theta.$$

The direction of movement of the various elements of the optical system is in the direction of the principal light beam which tilts an angle $\theta$ with respect to the optical axis.

Thus by moving the elements of the optical system in a manner to satisfy the aforesaid relations, it is possible to obtain an accurate alternation of magnification, to enable an image in focus to be formed on the image forming surface.

Figure 4:
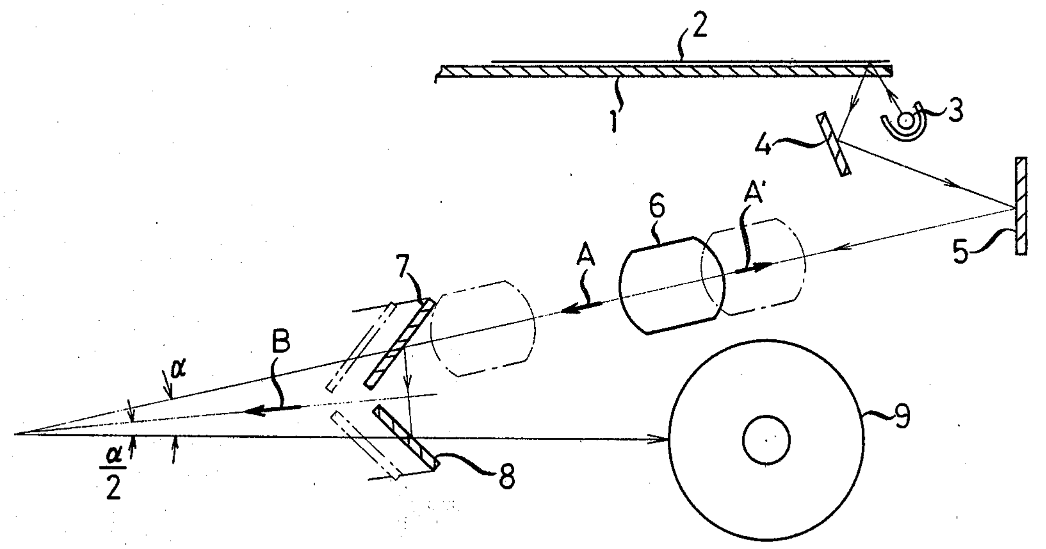
FIG. 4 is a view in explanation of one example of the image forming optical system generally used with a copying apparatus.

FIG. 4 shows an image forming optical system usually used with an electrophotographic copying apparatus. A document 2 placed on a contact glass member 1 is scanned by light beams emanating from a light source 3 movable to the left and right in the figure. The light beams reflected by the document 2 are again reflected by a first mirror 4 moving with the light source 3 as a unit, by a second mirror 5 moving in the same direction as the light source 3 at a speed half the speed of movement of the light source 3 and by third and fourth mirrors 7 and 8 after passing through an image forming lens 6, to form an image on the surface of a photosensitive drum 9. In this construction, the optical path from the surface of the document 2 to the surface of the photosensitive drum 9 is kept constant at all times. In place of moving the light source 3, first mirror 4 and second mirror 5, the document 2 may be moved at a constant speed.

Figure 5:
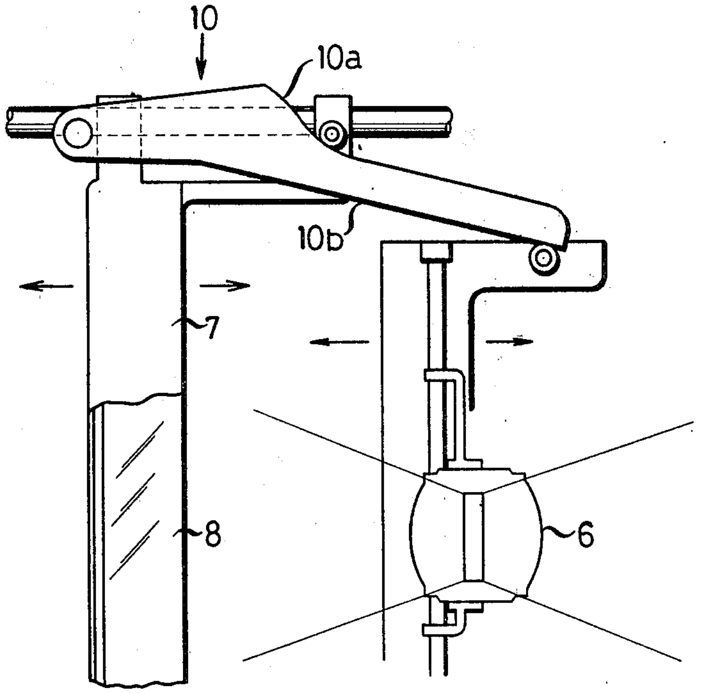
FIG.5 PRIOR ART
FIG. 5 is a plan view of one example of the magnification varying mechanism of the prior art.

When the optical system of the aforesaid construction is used for performing copying in multiple mode based on the principle described hereinabove, one has only to move the lens 6 and the third and fourth mirrors 7 and 8 in a manner to satisfy the aforesaid relations. As a means for moving the elements of the optical system as aforesaid, a magnification varying mechanism suitable for use with a copying apparatus capable of effecting copying both without magnification and reduction and in reduction mode is disclosed in Japanese Patent Application Laid-Open No. 65736/78 which comprises, as shown in FIG. 5, a cam 10*b* for converting the distance covered by the movement of the lens 6 into a rotational angle, and a cam 10*a* for moving the third and fourth mirrors 7 and 8, the cams 10*b* and 10*a* being formed on a single cam member 10. The cam member 10 comprises a cam surface of the cam 10*b* for following up the movement of the lens 6 which is in the form of a straight line, and a cam surface of the cam 10*a* for moving the mirrors 7 and 8 which is in the form of a curve.

When the copying apparatus is switched from copying without magnification and reduction to copying in reduction or magnification mode, the distance Δa covered by the movement of the lens becomes positive in reduction mode and negative in magnification mode, as described hereinabove. The distance ΔL' covered by the movement of the image forming surface is expressed by the following equation:

$$\Delta L' = \Delta a + \Delta b = \left(m + \frac{1}{m} - 2\right) = \frac{(m-1)^2}{m} f,$$

so that ΔL' is positive at all times regardless of whether the magnification m is larger or smaller than unity. To enable the explanation to be readily understood, it is assumed that the principal light beam coincides with the optical axis. However, the same explanation applies even if the principal light beam is tilting with respect to the optical axis. Thus the distance L between the subject and the image forming surface is minimized when copying is effected without magnification and reduction and becomes larger when copying is effected both in magnification and reducing modes than when copying is effected without magnification and reduction.

The magnification varying mechanism of the prior art described hereinabove is adapted for use with copying apparatus for effecting copying without magnification and reduction and in reduction mode only. Thus the cam surface of the cam 10*a* is profiled such that it is a smooth curve having no peak to allow the mirrors 7 and 8 to move leftwardly when the lens 6 moves leftwardly. However, when a single magnification varying mechanism is used for effecting copying both without magnification and reduction and magnification and reduction modes, it would be impossible to obtain a magnification varying mechanism capable of accomplishing the object without any trouble, for the following means. In reduction mode, both the lens and mirrors move leftwardly, but the lens moves rightwardly while the mirrors move leftwardly in magnification mode. Thus, if the cam surface of the cam 10*b* is in the form of a straight line, then the cam surface of the cam 10*a* would have a steep angular form with a vertex serving as a point of engagement by the cam follower when copying is effected without magnification and reduction. This causes a sudden change in the shape of the cam surface, making it difficult to fabricate the cam member and also making it difficult for the cam follower to be kept in engagement therewith.

Therefore, it is an object of the invention to provide a magnification varying mechanism for a copying apparatus capable of effecting copying both without magnification and reduction and in magnification and reduction modes by using a single cam member formed with a cam surface for converting the distance covered by the movement of the lens into a rotational angle and a cam surface for moving the third and fourth mirrors in accordance with the obtained rotational angle in which the two cam surfaces have smooth profiles to allow the cam follower to be kept in engagement therewith without any trouble and the cam member can be readily fabricated without entailing a rise in cost.

Referring to FIG. 4 again, the lens 6 moves leftwardly as indicated by an arrow A and the third and fourth mirrors 7 and 8 move leftwardly as indicated by an arrow B, when copying is performed in reduction mode.

In magnification mode, the lens 6 moves rightwardly as indicated by an arrow A′, and the mirrors 7 and 8 move leftwardly as indicated by the arrow B.

In this case, when the angle formed by the direction of incidence of the light beams on the third mirror 7 (in the direction of the arrow A) and the direction of reflection of the light beams by the fourth mirror 8 is denoted by $\alpha$, the path of the reflected light beams by the fourth mirror 8 would remain unchanged if the third and fourth mirrors 7 and 8 were made to move as a unit in the direction of the bisector of the angle $\alpha$.

As described hereinabove, the distance covered by the movement of the lens is expressed by the following equation:

$$\Delta a = \left(\frac{1}{m} - 1\right) f.$$

Figure 6:
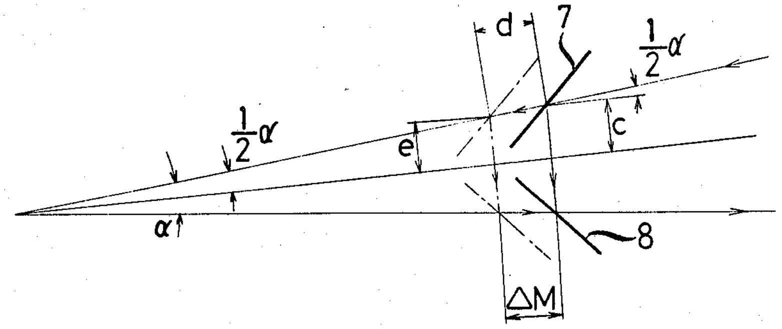
FIGS. 6 and 7 are schematic views in explanation of the principle of the invention.

Also, the distance $\Delta M$ covered by the movement of the principal light beam between the third and fourth mirrors is expressed by the following equations from FIG. 6:

$$\Delta m = d \cos \tfrac{1}{2}\alpha \quad (1)$$

$$d \sin \tfrac{1}{2}\alpha + e = c \quad (2)$$

$$\Delta L'/2 = d + e - c \quad (3)$$

From equations (2) and (3), $$d = \frac{\Delta L}{2(1 - \sin \tfrac{1}{2})} \quad (4)$$

From equations (1) and (4), $$\Delta M = \frac{\left(m + \frac{1}{m} - 2\right) f}{2\,(1 - \sin \tfrac{1}{2}\alpha)} \quad (4)$$

Figure 7:
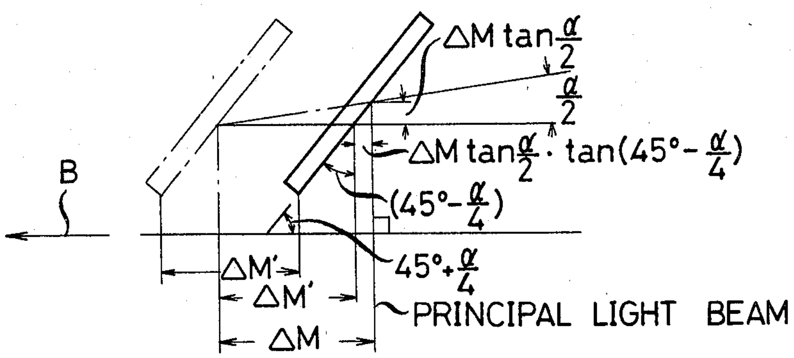

The distance $\Delta M'$ covered by the movement of the mirrors 7 and 8 in the B direction is expressed by the following equations from FIG. 7:

$$\Delta M' = \Delta M\left\{1 - \tan\frac{\alpha}{2} \cdot \tan\left(45^\circ - \frac{\alpha}{4}\right)\right\} \quad (6)$$

The following relation holds from $$\Delta a = \left(\frac{1}{m} - 1\right) f:$$

$$m = \frac{f}{\Delta a + f} \quad (7)$$

From equations (5), (6) and (7), $$M' = \frac{\Delta a^2 \cos\frac{\alpha}{2}\left\{1 - \tan\frac{\alpha}{2} \cdot \tan\left(45^\circ - \frac{\alpha}{4}\right)\right.}{2\,(a + f)\left(1 - \sin\frac{\alpha}{2}\right)} \quad (8)$$

The $\alpha$ and f on the left side of the above equation are constant, so that the distance covered by the movement of the third and fourth mirrors 7 and 8 is uniquely decided by the distance $\Delta a$ covered by the movement of the lens 6. Thus by forming the two cam surfaces of the cams 10*a* and 10*b* of the cam member 10 in a manner to satisfy the aforesaid relation, it is possible to obtain at all times a clear image formed on the image forming surface.

The relation described hereinabove holds for both magnification and reduction modes. It has already been described that when copying in magnification mode and copying in reduction mode are performed by using the same cam member, it is necessary to reverse the direction of movement of the mirrors with respect to the direction of movement of the lens with the copying without magnification and reduction serving as a turning point.

Figure 8:
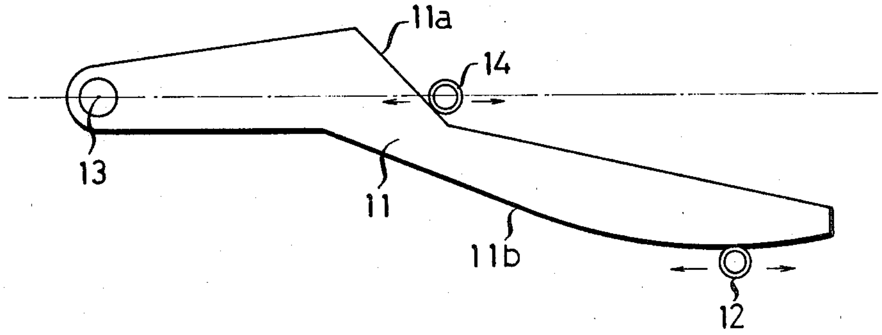
FIG. 8 is a plan view of an embodiment of the magnification varying cam according to the invention.

To accomplish the aforesaid object, there is provided according to the invention a magnification varying cam member 11 formed with two cam surfaces or a cam surface 11*a* and a cam surface 11*b* as shown in FIG. 8. The second cam surface 11*b* which follows up the movement of the lens 6 is in smooth arcuate form and profiled such that as cam follower 12 moves past a contact point for copying without no magnification and reduction, the direction of pivotal movement of the cam member 1 about a pivot 13 is reversed. More specifically, regardless of the direction of movement of the cam follower 12 past this contact point, the cam member 11 moves in pivotal movement clockwise about the pivot 13 in the figure, and the first cam surface 11*a* is of simple configuration to allow a cam follower 14 to move in one direction as the cam member 10 pivotally moves in one direction. By selecting a suitable profile for the second cam surface 11*b*, it is possible to give such a profile to the first cam surface 11*a* to be in a straight line, thereby facilitating fabrication of the cam member 11 and increasing the accuracy with which operation is performed.

When it is desired to specify the rate of magnification and the rate of reduction, the end can be attained by accurately selecting the projections at points on the cam surface which correspond to the desired magnifications and connecting the projections together by a continuous curve of a suitable shape. By forming the cam surfaces in a curve that would satisfy the relation described hereinabove at any and every point on the curved cam surface, it is possible to continuously vary magnification by continuously altering the scanning speed. Even if the magnification rate is not continuous, the cam member having above mentioned form can be used universally with copying apparatus of different magnification rates.

In the aforesaid construction, when the lens is moved forwardly (leftwardly in the figure) in reduction mode, the cam member 11 pivotally moves clockwise about the pivot 13 with the cam surface 11*b* following up the movement of the cam follower 12, and the cam follower 14 mounted on the mirror moves forwardly by following up the movement of the cam surface 11*a*, to allow the lens and the mirrors to move in the same direction while being maintained in the aforesaid relation. In magnification mode, when the lens is moved rearwardly (righwardly in the figure), the cam member 11 also follows the movement of the cam follower 12 and pivotally moves clockwise about the pivot 13 and the cam follower 14 moves forwardly by following up the movement of the cam surface 11*a*, to allow the lens and mirrors to move in the opposite directions while being maintained in the relation expressed by equation (8). Thus it is possible to perform copying without magnification and reduction and in both magnification and reduction modes by using the single magnification varying cam member 11. The profile of the cam member 11 is smooth enough to enable magnification varying to be effected with a high degree of accuracy.

Figure 9:
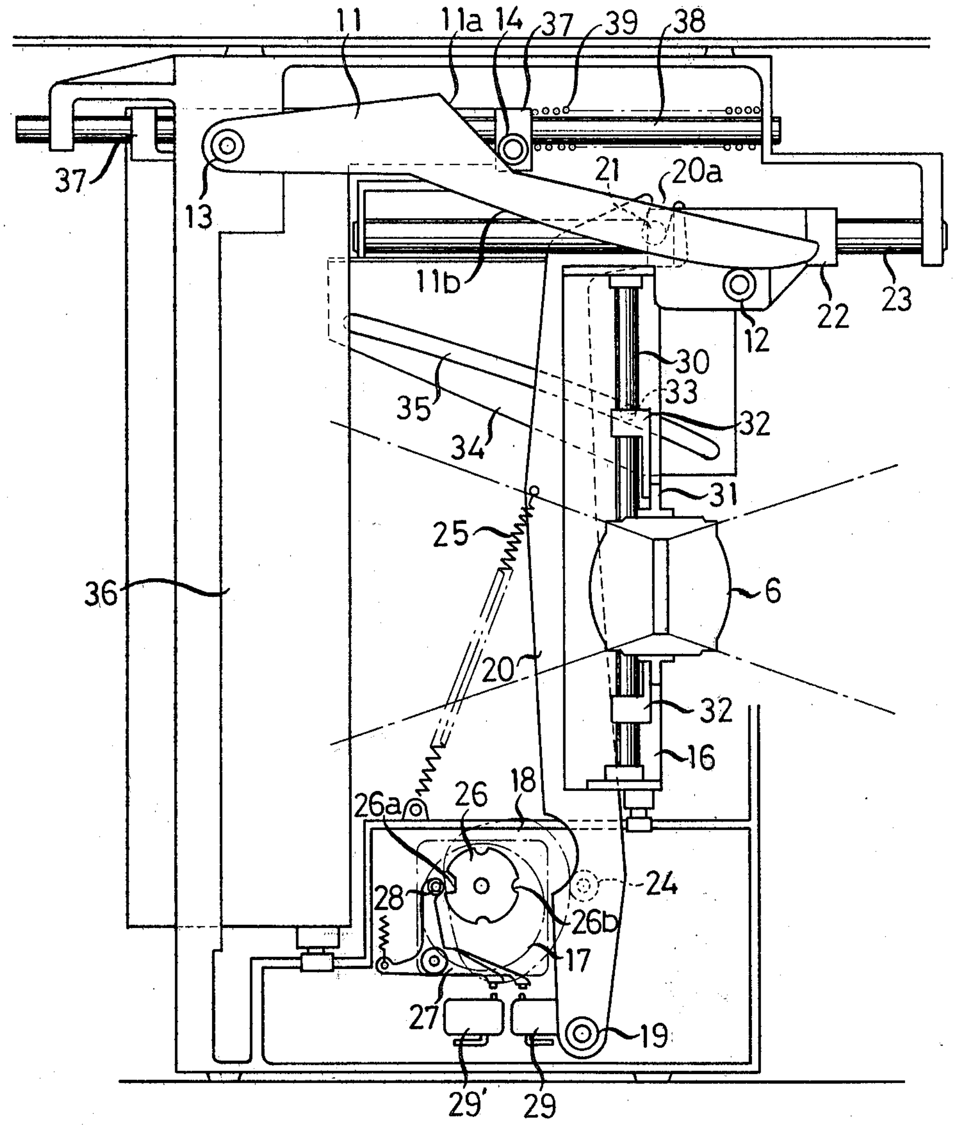
FIG. 9 is a plan view of the magnification varying mechanism of a copying apparatus using the magnification varying cam shown in FIG. 8 for effecting copying both in magnification and reduction modes.
Figure 10:
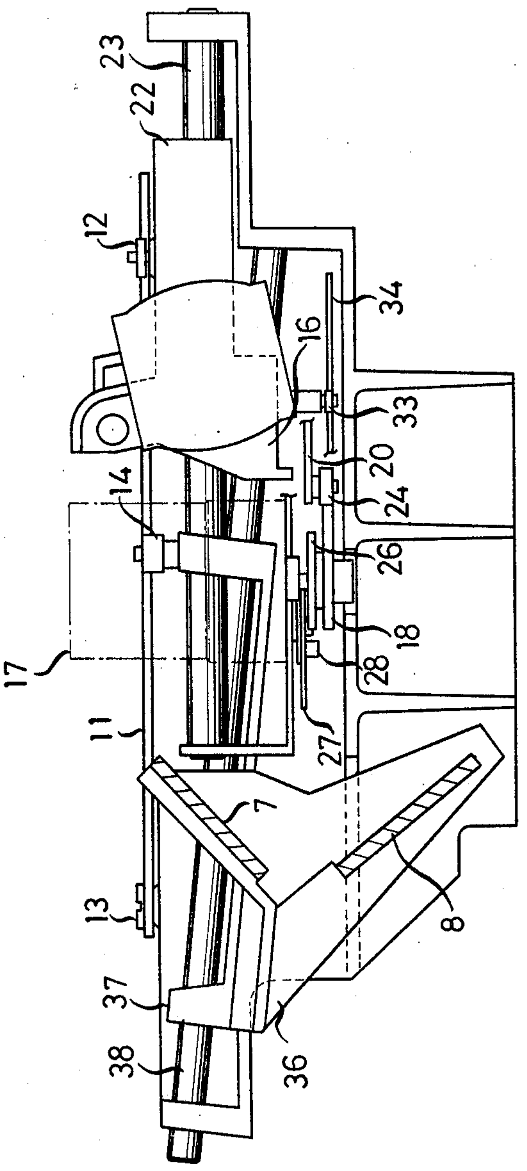
FIG. 10 is a side view of the magnification varying mechanism shown in FIG. 9.

A lens and mirror moving mechanism of the multiple mode copying apparatus comprising one embodiment of the invention capable of effecting copying in magnification and reduction modes by using the magnification varying mechanism according to the invention will be described by referring to FIGS. 9 and 10.

A lens moving carriage 16 has attached to its undersurface a follower 21 engaged in a gap between two members of a bifurcated portion 20*a* formed at a free end of a lever 20 pivotally supported at a pivot 19 for movement through a cam 18 mounted at a lower end of a shaft of a drive motor 17. The lens moving carriage 16 is driven by the motor 17 and moves back and forth. A guide cylinder 22 secured to an upper portion of the carriage 16 is loosely fitted for sliding movement over a guide rod 23 secured horizontally to a machine frame lengthwise thereof. As the lever 20 moves in pivotal movement, the lens moving carriage 16 moves back and forth in linear motion along the guide rod 23.

A tension spring 25 is mounted obliquely between an intermediate point on the lever 20 and the machine frame. This keeps a cam follower 24 mounted on the lever 20 in contact with the cam 18 at all times, to enable the lens moving carriage 16 to move as designed without failure and to be kept in place in the desired position.

A disc 26 formed with cutouts at its peripheral edge portion secured to the shaft of the motor 17 serves as means for stopping the lens moving carriage 16 in positions corresponding to copying without magnification or reduction and copying with desired magnification rates respectively. The cutouts include a first cutout of large depth 26*a* corresponding to the position of the lens moving carriage 16 for copying without magnification and reduction and a plurality of cutouts of small depth 26*b* corresponding to a plurality of magnification rates respectively. A follower 28 attached to one end of a split lever 27 is in engagement in the peripheral edge of the disc 26. When the follower 28 is brought into engagement with the cutout of large depth 26*a*, microswitches 29 and 29' and simultaneously actuated by two forward ends of the split lever 27 respectively. When the follower 28 is brought into engagement in the cutouts of small depth 26*b*, only the microswitch 29 is actuated and produces a signal or signals inputted to a control and the number of the inputted signals is counted. The desired magnification varying position is detected based on the number of times the switch is actuated as counted from the position of copying without magnification and reduction. If the detected position agrees with the magnification rate set by the operator, then rotation of the drive motor 17 is interrupted. In the vicinity of the position in which the motor 17 is brought to a halt, the cam 18 is profiled such that the peripheral edge is in the form of a circular arc centered at the center of rotation of the cam 18. Thus even if the position in which the motor 17 comes to a halt is displaced slightly from the regular position, such displacement is accommodated and the angle of pivotal movement of the lever 20 is kept at an angle corresponding to the predetermined magnification rate, to allow the lens moving carriage 16 to stop accurately in the predetermined position.

The lens moving carriage 16 has secured thereto a guide rod 30 extending crosswise with respect to the direction of movement of the carriage 16 and having loosely fitted thereover for sliding movement a guide cylinder 32 secured to a lens bracket 31 for mounting the lens 6. The lens bracket 31 has attached to its undersurface a cam follower 33 maintained in engagement in a cam groove 35 formed in a cam plate 34 secured to the machine frame. Thus as the lens moving carriage 16 moves back and forth, the lens bracket 31 and the lens 6 supported thereon move crosswise, to allow an image to be formed in such a manner that the reference side of the image of the document coincides with the reference side of a photosensitive drum, regardless of the magnification rate.

The cam follower 12 is mounted on the surface of the lens moving carriage 16 and in engagement with the second cam surface 11*b* of the magnification varying cam 17 pivotable about a shaft 13 secured to the machine frame. The magnification varying cam 11 is a cam of the cam profile according to the invention described in detail in the foregoing description.

Meanwhile the third and fourth mirrors 7 and 8 are mounted on a mirror bracket 36 provided with a guide cylinder 37 extending lengthwise to allow a guide rod 38 secured to the machine frame to extend in the direction of movement of the mirrors to be loosely fitted therein for sliding movement. The cam follower 14 mounted on the surface of the guide cylinder 37, and a compression spring 39 is mounted between a rear end of the guide cylinder 37 and the machine frame. This brings the cam followers 14 and 12 into pressing engagement with with first cam surface 11*a* of the magnification varying cam 11 and the second cam surface 11*b* respectively at all times. Thus as the lens 6 is moved back and forth by the drive motor 17 through the lens moving carriage 16, the mirrors 7 and 8 move back and forth while being kept in the predetermined relation as described hereinabove.

From the foregoing description, it will be appreciated that the invention enables copying not only in reduction mode but also in reduction and magnification modes to be smoothly effected by a simple construction by using a single copying apparatus, thereby contributing to multiplification of the function of copying apparatus.

What is claimed is:

1. A multiple mode copying apparatus comprising:

drive means for moving a lens in the direction of a principle light beam;

conversion cam means for converting the distance covered by the movement of said lens into a rotational angle; and mirror moving means for moving mirrors in accordance with said rotational angle;

wherein the improvement resides in that said conversion cam means comprises a cam member formed with a first cam surface for deciding the distance to be covered by the movement of said mirrors, and a second cam surface for following up the distance covered by the movement of said lens, said second cam surface being profiled such that it is in the form of an arc such that when a cam follower moves past a point of contact of the cam follower for effecting copying without magnification and reduction, the direction of movement of the cam member is reversed by starting at said point of contact.

2. A multiple mode copying apparatus as claimed in claim 1 wherein said second cam surface of said cam member of said conversion cam means is profiled to be in the form of a straight line.

* * * * *